(12) United States Patent
Pepe

(10) Patent No.: US 10,434,455 B2
(45) Date of Patent: Oct. 8, 2019

(54) OZONE ABATEMENT SYSTEM FOR SEMICONDUCTOR MANUFACTURING SYSTEM

(71) Applicant: International Business Machines Corporation, Armonk, NY (US)

(72) Inventor: Edward L. Pepe, Middletown, NY (US)

(73) Assignee: International Business Machines Corporation, Armonk, NY (US)

(*) Notice: Subject to any disclaimer, the term of this patent is extended or adjusted under 35 U.S.C. 154(b) by 228 days.

(21) Appl. No.: 15/215,996

(22) Filed: Jul. 21, 2016

(65) Prior Publication Data

US 2016/0325219 A1 Nov. 10, 2016

Related U.S. Application Data

(62) Division of application No. 14/154,218, filed on Jan. 14, 2014, now Pat. No. 9,452,379.

(51) Int. Cl.
*B01D 53/00* (2006.01)
*B01D 53/66* (2006.01)
*F23G 7/06* (2006.01)

(52) U.S. Cl.
CPC .......... *B01D 53/007* (2013.01); *B01D 53/66* (2013.01); *F23G 7/068* (2013.01); *B01D 2258/0216* (2013.01); *B01D 2259/804* (2013.01); *Y10T 137/206* (2015.04)

(58) Field of Classification Search
CPC .............. B01D 53/007; B01D 53/66; B01D 2258/0216; B01D 2259/804; B01D 53/885; B01D 2255/802; B01D 2257/90; F23G 7/068; Y10T 137/206; A61L 9/205; B01J 19/123; B01J 2219/0875; B01J 2219/0892; C02F 2303/02
See application file for complete search history.

(56) References Cited

U.S. PATENT DOCUMENTS

| 5,935,525 A | 8/1999 | Lincoln et al. |
| 8,237,296 B2 | 8/2012 | Hancer |
| 8,404,186 B2 | 3/2013 | Clark et al. |

(Continued)

FOREIGN PATENT DOCUMENTS

| JP | 05285342 A | 11/1993 |
| JP | 2000015255 A | 1/2000 |

(Continued)

OTHER PUBLICATIONS

"Air Sterilization Products"; Novatron, Inc.; © 2012; 2 pages; <http://www.novatroninc.com/products>.

(Continued)

*Primary Examiner* — Xiuyu Tai
(74) *Attorney, Agent, or Firm* — L. Jeffrey Kelly

(57) ABSTRACT

An apparatus and method for abating ozone and reducing sulfuric acid from an exhaust stream. In a semiconductor manufacturing plant the processing of wafers involves the cleaning and etching of wafers, the resultant processing may produce gasses which must be abated. The apparatus and method utilizes UV light in high doses to convert ozone ($O_3$) to oxygen ($O_2$). By ensuring laminar flow through the UV light chambers, the efficiency of the system is sufficient to allow for the remaining impurities in the exhaust air to be removed through the use of an RTO.

20 Claims, 6 Drawing Sheets

(56) References Cited

U.S. PATENT DOCUMENTS

| | | |
|---|---|---|
| 2003/0021720 A1 | 1/2003 | Reisfeld et al. |
| 2004/0045578 A1 | 3/2004 | Jackson |
| 2010/0150793 A1 | 6/2010 | Chan |
| 2012/0315184 A1 | 12/2012 | Clark |
| 2015/0196865 A1 | 7/2015 | Pepe |
| 2015/0250914 A1 | 9/2015 | Aeifin et al. |

FOREIGN PATENT DOCUMENTS

| | | |
|---|---|---|
| JP | 2000332006 A | 11/2000 |
| JP | 2002001318 A | 1/2002 |
| JP | 5003976 B2 | 8/2012 |
| WO | 9424043 A1 | 10/1994 |
| WO | 03051777 A1 | 6/2003 |

OTHER PUBLICATIONS

Pepe; U.S. Appl. No. 15/216,063, filed Jul. 21, 2016; Entitled "Ozone Abatement System for Semiconductor Manufacturing System".

OZONE ABATEMENT SYSTEM FOR SEMICONDUCTOR MANUFACTURING SYSTEM

BACKGROUND

The present invention relates to methodologies and an apparatus for the abatement of ozone produced during the processing of semiconductor wafers.

Semiconductor device fabrication involves various processing steps which may fall into four general categories: deposition, removal, patterning, and modification of electrical properties. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal is any process that removes material from the wafer; examples include etch processes (either wet or dry) and chemical-mechanical planarization (CMP). Patterning is the shaping or altering of deposited materials, and is generally referred to as lithography. For example, in conventional lithography, the wafer is coated with a chemical called a photoresist; then, a machine called a stepper focuses, aligns, and moves a mask, exposing select portions of the wafer below to short wavelength light; the exposed regions are washed away by a developer solution. After etching or other processing, the remaining photoresist is removed by plasma ashing. Modification of electrical properties has historically entailed doping transistor sources and drains (originally by diffusion furnaces and later by ion implantation). These doping processes are followed by furnace annealing or, in advanced devices, by rapid thermal annealing (RTA); annealing serves to activate the implanted dopants. Modification of electrical properties now also extends to the reduction of a material's dielectric constant in low-k insulators via exposure to ultraviolet light in UV processing (UVP). Modern chips have up to eleven metal levels produced in over 300 sequenced processing steps.

Many toxic materials are used in the fabrication process. These include: poisonous elemental dopants, such as arsenic, antimony, and phosphorus, poisonous compounds, such as arsine, phosphine, and silane, and highly reactive liquids, such as hydrogen peroxide, fuming nitric acid, sulfuric acid, and hydrofluoric acid.

One chemical that has recently been introduced into the process is ozone ($O_3$). DNS (Dainippon Screen Manufacturing Company) Single wafer processing wet tools DC-08, DC-09, DC-10 & DC-11 use a new cleaning chemistry of sulfuric acid and Ozone.

Ozone (O3) is a form of oxygen that consists of three oxygen atoms joined together into a molecule. This form of oxygen has significantly different characteristics than the common oxygen molecule (O2), which consists of two oxygen atoms. The ordinary O2 form of oxygen is, of course, present in the air we breathe and is indeed necessary for life.

The role of ozone in the environment is more complicated. First, ozone in the upper atmosphere plays an important role in protecting life on earth by absorbing dangerous short wavelength UV from the sun. However, it is harmful in the lower atmosphere since it is an irritant when breathed and is therefore an undesirable air pollution component.

The ozone used in fabrication must be abated before being exhausted into the environment. Conventional methods of ozone abatement utilize carbon filters to reduce the ozone and sulfuric acid to acceptable levels. The final stage of abatement systems is an acid scrubber to remove the remaining sulfuric acid. The acid scrubber is a water wash that the exhaust is passed through. One issue with the carbon filters is a result of the need to constantly change out the filters over time. This requires significant maintenance and cost.

SUMMARY

The inventors have proposed a new and novel approach to abate the level of Ozone in waste gasses for a semiconductor processing system. The inventor has determined that Ozone in semiconductor manufacturing waste gasses may be abated with the use of UV light to break down the Ozone from $O_3$ to $O_2$.

In one embodiment the system may comprise a first reflective chamber, the reflective chamber having inner surfaces with a diffuse reflective material. An inlet is adapted to accept exhaust air from an exhaust duct and direct the exhaust air to the reflective chamber in a generally laminar flow. At least a first plate is located between the inlet and the reflective chamber to further induce laminar flow in the reflective chamber.

At least one plate may be located in the reflective chamber to further aid in the laminar flow through the reflective chamber. As the plate is located in the reflective chamber the plate may be coated with a diffuse reflective material.

As the exhaust air may include caustic materials such as sulfuric acid, and to reduce the ppmv of the ozone, the system may be adding bleed air to the exhaust duct. By introducing bleed air the system reduces the density of the ozone in the air making the reflective chamber more effective. In addition, the bleed air lessens the density of the caustic materials in the exhaust air improving the life of the system.

To improve the performance of the system, a second reflective chamber may be added in series with the first reflective chamber. To ensure laminar flow a plurality of plates may be added to the first and second reflective chambers. The plates may be perforated with a plurality of holes. The plates may be at least the cross sectional area of the chamber cavity to ensure laminar flow. In addition, the reflective plates may be coated with a diffuse reflective material such as polytetrafluoroethylene.

To further ensure laminar flow is achieved, a plurality of plates may be inserted between the inlet and the reflective chamber. In addition, a plurality of plates may also be inserted between the first and second reflective chambers to further induce laminar flow in the reflective chambers.

The method of abating the ozone from the semiconductor manufacturing exhaust waste may include introducing the exhaust containing ozone and sulfuric acid to a chamber. To reduce the density of the ozone and other caustic materials the system may introduce bleed air into the exhaust. To ensure performance of the system, laminar flow is promoted through the use of perforated plates and an inlet designed to promote a laminar transition from the exhaust duct to the reflective chambers. The ozone is then exposed to high doses of UV light to break down the ozone into oxygen. Finally the exhaust is provided to a regenerative thermal oxidizer (RTO).

DETAILED DESCRIPTION

Figure 1:
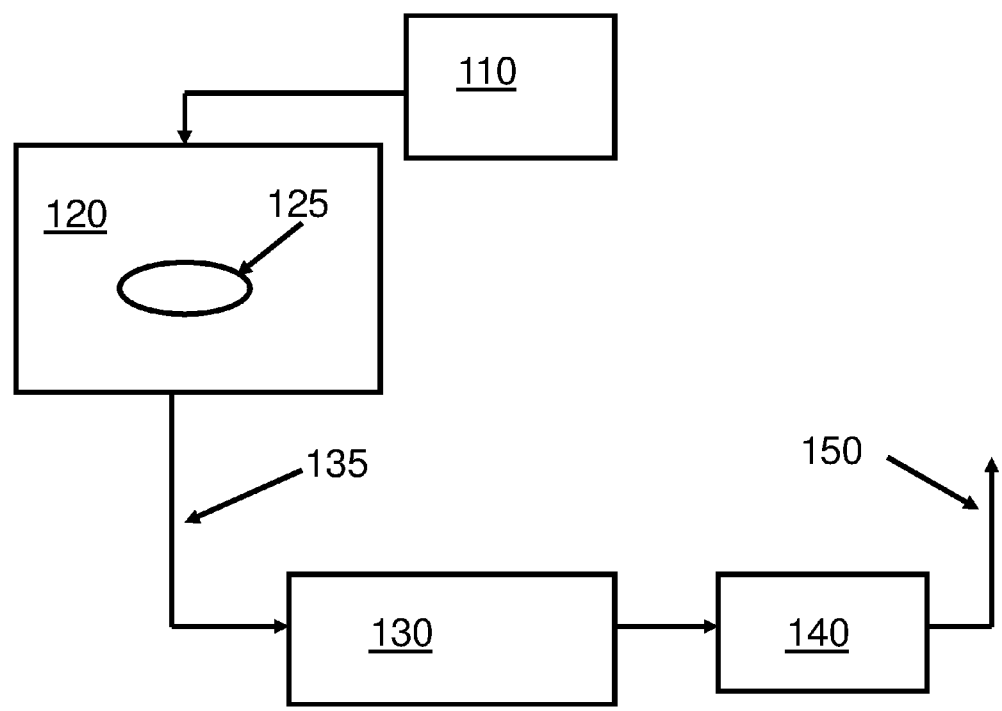
FIG. 1 illustrates a schematic diagram of a prior art ozone abatement system.

Referring to the drawings, FIG. 1 illustrates a schematic diagram of a conventional solution to the ozone abatement for the DNS single wafer processing tool. The ozone is generated with an ozone generator 110 which is provided to a process chamber 120. The ozone is mixed with sulfuric acid and off gases as the wafer 125 is processed. The off gas is exhausted through exhaust ducts 125 to a carbon filter 130. The exhaust ducts 135 may be stainless steel and coated with Halar to prevent damage from the sulfuric acid. The gas passing through the carbon filter 130 is then provided to an acid scrubber 140 to remove any remaining sulfuric acid. The gas is then exhausted through stack 150 into the atmosphere. The carbon filters 130 require maintenance as the ozone and sulfuric acid is absorbed by the filters. This requires periodic replacement of the filter and disposal of the used filters. This may be costly and involve significant manpower. The inventor proposes a solution to this embodiment that avoids the constraints of the carbon filter system.

Figure 2:
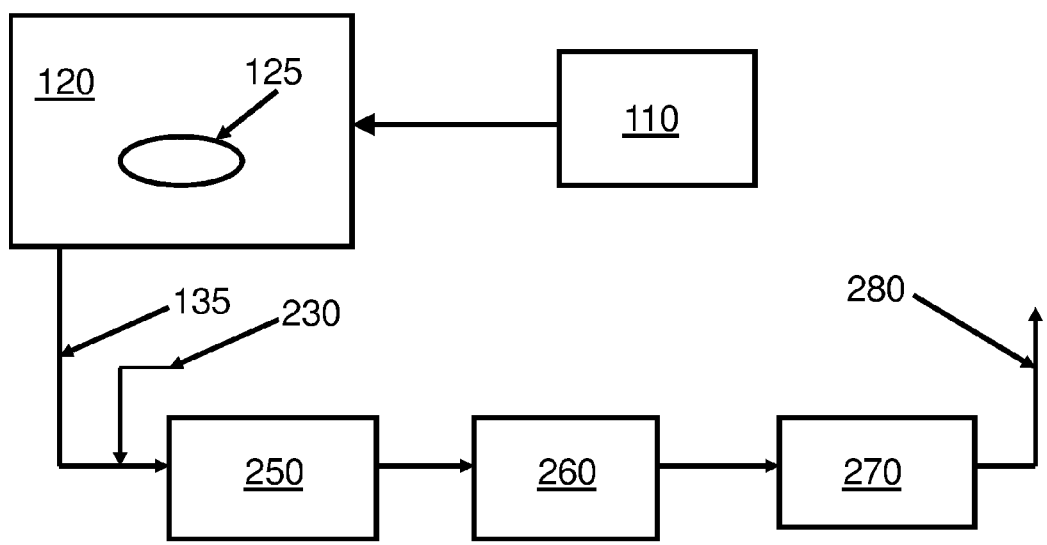
FIG. 2 illustrates a schematic diagram of an embodiment of the invention.

FIG. 2 illustrates a schematic diagram of an embodiment of the invention. The ozone is generated with an ozone generator 110 and provided to a process chamber 120 to process the wafers 125. The process chamber 120 utilizes the ozone in combination with sulfuric acid to more precisely process the wafers 125. The process chamber 120 may be a DNS (Dainippon Screen Manufacturing Company) single wafer processing wet tool, DC-08, DC-09, DC-10 or DC-11. DNS's process produces exhaust gas that comprises ozone at 250 CFM at 0.4 pounds of ozone per hour (lbs/hour) or 215 parts per million by volume (ppmv). In addition the exhaust gas comprises sulfuric acid which evaporates from the etching and cleaning solution.

The first step in the processing of the waste gas may be to dilute the waste gas by adding bleed air 230 at 50 to 250 CFM to the waste gas. The result of this additional bleed air may increase the flow of exhaust air to about 300 to 500 CFM and may be to reduce the sulfuric acid to non-detectable levels and the ozone from 179 to 107 ppmv. The reduced volume of sulfuric acid reduces the acid to a level that is less harmful to the abatement tooling. In addition, by reducing the ppmv of the ozone the inventor has determined that the effectiveness of the abatement at later stages improves.

The exhaust air may then be fed to an ozone abatement chamber 250 which will utilize UV energy to abate the ozone to about 21 ppm. The inventor has determined it may be useful to reduce the ozone further to a level below 10 ppmv to nitrous oxide prior to providing it to a regenerative thermal oxidizer or RTO 270. Therefore, one embodiment of the invention may provide the exhaust air to a second chamber 260. The exhaust air may be abated such that the level of ozone is reduced to about 9 to 5 ppm at from 300 to 500 CFM.

The final step in the process to remove any remaining sulfuric acid and/or ozone is to provide the exhaust air to an RTO 270. An RTO is essentially a large oven that heats exhaust passing through it to 1500° C. As stated before, the inventor has determined that the level of ozone entering the RTO should be less than 10 ppmv. The inventor has found that when the ozone level is above this level, the RTO may produce unacceptable levels of nitrous oxide $N_2O$. The exhaust gas is then exhausted through a stack 280 to the environment. The final exhaust gas must contain gas wherein the exhaust comprises gas with less than 3.0 lbs/hr of $N_2O$.

The inventor has determined that ultraviolet energy at the proper wavelength interacts with ozone to disassociate it into ordinary oxygen ($O_2$) and atomic oxygen. The inventors have determined that one such system which may be utilized was created by Novatron. The wavelength used in Novatron's AUVS systems, may be effective for disassociation of ozone. The Novatron system is described in U.S. Pat. No. 8,404,186 issued on Mar. 26, 2013 and is hereby incorporated by reference. The key to the Novatron system is the introduction of surfaces with high reflectivity to UV light. In one embodiment, the emitter may be any source of UV, such as a flashlamp or a pulsed lamp, which provides broad spectrum pulsed light and can be purchased through vendors such as Fenix, of Yuma, Ariz., medium pressure mercury arcs, available from Hanovia Corp, and germicidal lamps.

The Novatron system further utilizes a coating on the surface of the chamber of a diffuse reflective material. The highly diffuse reflective material may comprise one or more of: Spectralon™ which has a reflectivity of about 94%, ODM, manufactured by Gigahertz-optik, which has a reflectivity of 95%, and DRP which has a reflectivity of 99.4 to 99.9%. Spectralon™, which is a highly Lambertian, thermoplastic material that can be machined into a wide variety of shapes to suit various reflectance component requirements, may be purchased from Labsphere, Inc. DRP can be purchased in sheet form, with a peel and stick backing from W. L. Gore and Associates. In another embodiment, the highly reflective material comprises an Alzak oxidized aluminum, which has a reflectivity of about 86%. One such diffuse reflective material is ePTFE (expanded PTFE, Polytetrafluoroethylene) and has a reflectivity of 99% or better in the UV. When PTFE (also known as Teflon®) is expanded, millions of microscopic pores are created in a three-dimensional membrane structure. DRP is an example of a surface with high reflectivity based on favorable multiple scattering of light from the structure of the solid. Spectralon (See U.S. Pat. No. 5,462,705) is another example of a highly reflective surface resulting from compaction of small fluorinated polymer components, for a patent describing this type of reflector is Seiner's U.S. Pat. No. 4,035,085, which is hereby incorporated by reference for all purposes. This Seiner patent describes methods of producing highly reflective coatings with fluorinated polymers and references the Kubelka-Munk scattering analysis.

Very high, uniform UV doses in large volumes of air may accomplish significant ozone reduction in industrial air streams. The inventor has determined that the Novatron's AUVS reflective cavity technology may meet the requirements to abate the ozone to an acceptable level prior to entry into the RTO. By utilizing a highly reflective cavity the system the level of ozone abatement is significant enough to reduce the levels to an acceptable level. However, the inventor has determined that to achieve the level of abatement desired, laminar flow through the system is required.

Figure 3:
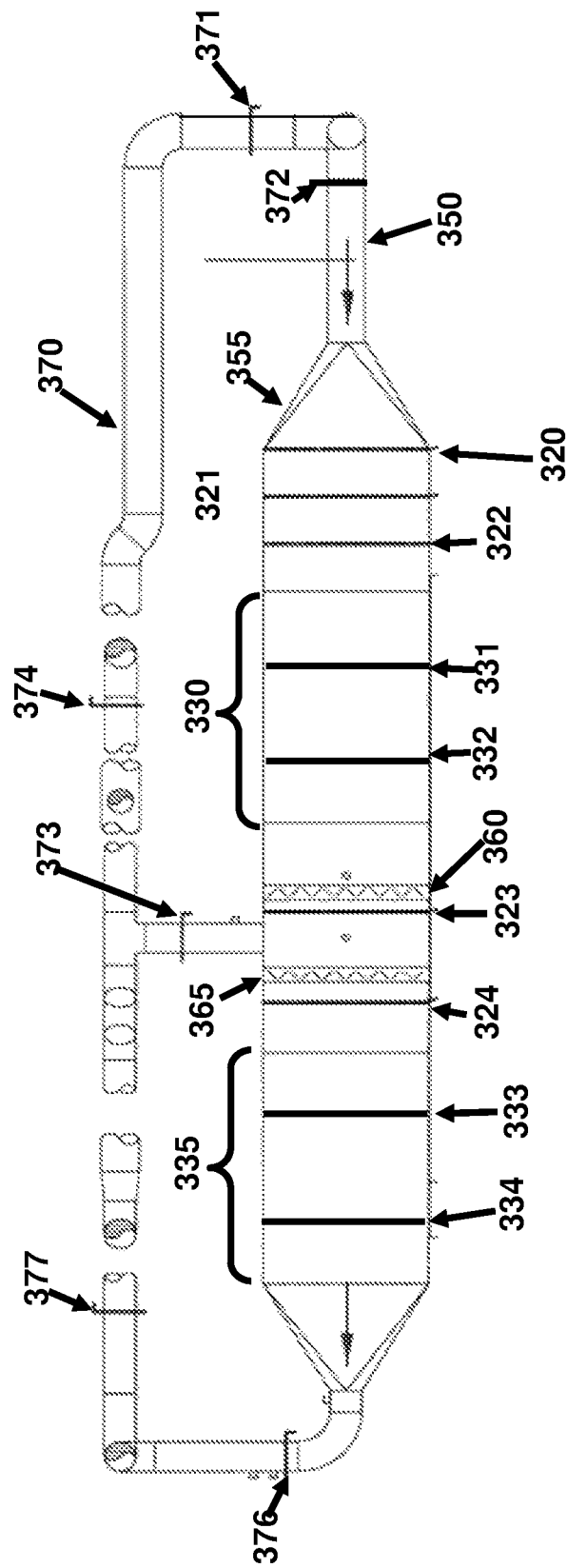
FIG. 3 illustrates an embodiment of an ozone abatement chamber.

FIG. 3 illustrates an embodiment of an ozone abatement chamber 310. The chamber 310 comprises a plurality of plates 320, 321, 322, 323 and 324 to create laminar flow through the chamber. Two reflective chambers 330 and 335 are located in the system. Reflective chambers 330 and 335 further contain additional plates 331, 332, 333 and 334 to ensure laminar flow is maintained through chambers. Reflective chamber 330 follows plates 320, 321 and 322. Reflective chamber 335 follows plates 223 and 224.

The exhaust is directed into the chamber 310 through ducts 350. The ducting is arranged such that it promotes laminar flow into the chamber. The inlet 355, take an exhaust input from a smaller diameter duct 350. The inlet 355 is configured as a trapezoid. In one embodiment the opening of the duct 350 is 8 inches. The inlet takes the duct 350 up to the opening of the first plate of 24 inches by 48 inches. The inlet 355 is 36 inches long to allow for smooth transition to promote laminar flow through the chambers.

The first set of plate 320, 321, and 322 may be perforated plates of 316 stainless steel, 0.625 inches thick with an equidistant array of 288 holes, each having a 7/16 inch diameter to promote laminar flow. All of the plates 320, 321, 322, 336, 331, 332, 337, 323, 324, 338, 333, 334 and 339 may be of the same size with the same characteristics. An embodiment of plates 320, 321, and 322 are better shown in FIG. 5. The plates 320, 321 and 322 are placed between the inlet 355 and the first reflective chamber 330. An embodiment of reflective chamber 330 is better described in FIG. 4.

Chamber 310 further comprises a plurality of dampers 360 and 365. Dampers 360 and 365 comprise a plurality of opposed blades. The dampers 360 and 365 may comprise blades that rotate to close and prevent air flow or rotate open further assist the laminar flow through the chamber 310. Dampers 360 and 365 are in place to allow for the chamber 310 to operate while shutting down one of the two reflective chambers 330 or 335.

To shut off reflective chamber 330, damper 372 and 360 are closed allowing for maintenance of reflective chamber 330. In addition dampers 371, 373, 374, and 376 are open, while damper 377 is closed. This allows exhaust air to flow through ducts 370 and 375 into reflective chamber 335. While the laminar flow will not be optimal, some abatement of the ozone will occur.

To shut off reflective chamber 335 for maintenance, dampers 365, 371, 374 and 376 are closed. In addition, dampers 360, 372, 373 and 377 are open. This allows the exhaust to flow through reflective chamber 330, while maintenance will be performed on reflective chamber 335. During normal operation dampers 360, 365, 372 and 376 are open while dampers 371, 374 and 377 are closed.

Figure 4:
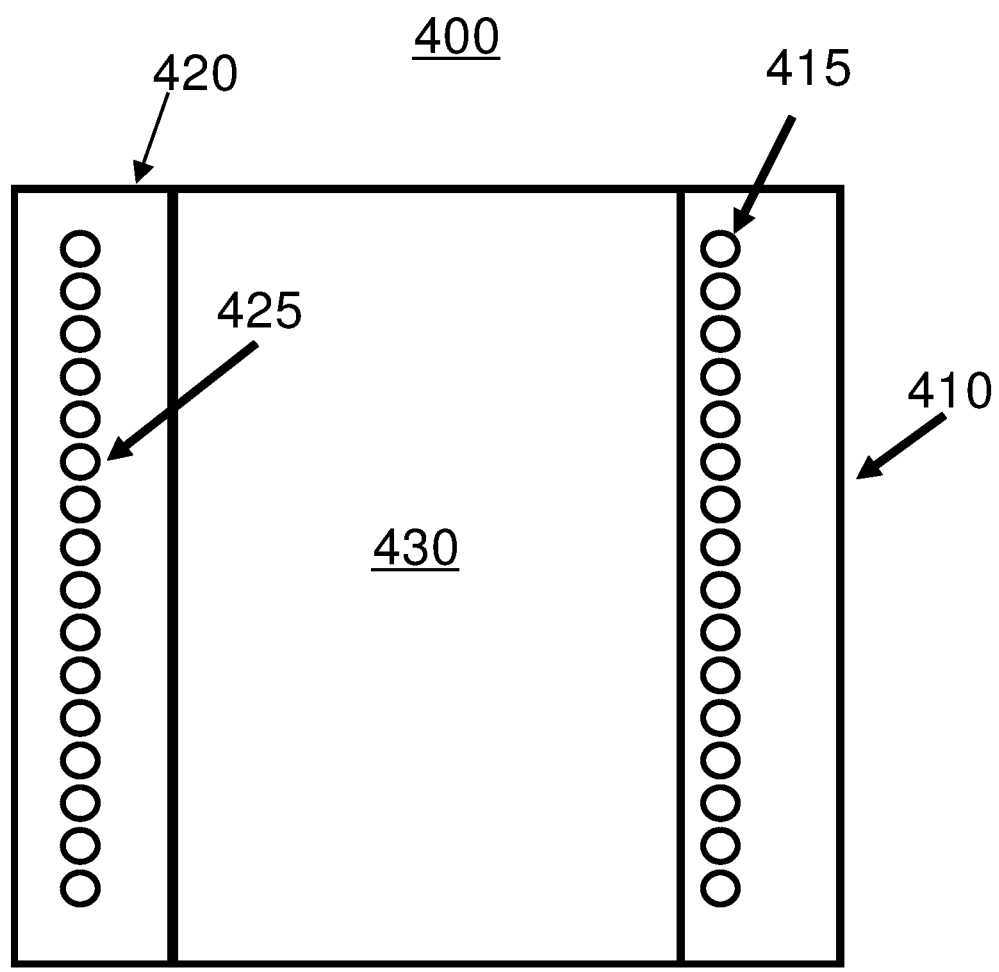
FIG. 4 illustrates an embodiment of a reflective chamber in the ozone abatement chamber.

FIG. 4 illustrates an embodiment of a reflective chamber in the ozone abatement chamber. The reflective chamber 400 comprises a central chamber 430 through which the exhaust gases pass, on either side of the central chamber doors 410 and 420 are located. Banks of lamps 415 and 425 are located in the doors 410 and 420 respectively. The lamps in one embodiment comprise 20 lamps. These lamps produce 400 watts of UV light. The inner surfaces of the doors 410 and 420 are coated with a diffuse reflective material such as DPR. The internal surfaces of the central chamber are also coated with a diffuse reflective material. To promote laminar flow, the lamps 415 and 425 are located with in doors 410 and 420 outside the central chamber 430 to promote laminar flow. The inventor further identified that heating of the exhaust as it passes through the reflective chamber may cause the warm exhaust to rise, introducing turbulence into the system. To promote laminar flow as shown in FIG. 3, plates 331, 332, 333, and 334 are placed in reflective chambers 330 and 335. The plates promote laminar flow in reflective chamber 400 and are coated with a diffuse reflective material such as DPR.

Figure 5:
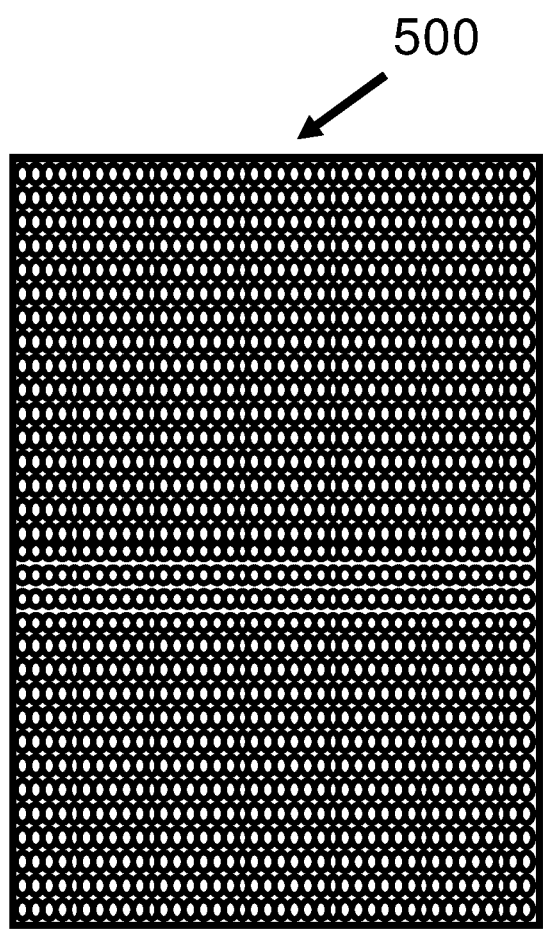
FIG. 5 illustrates a plate for the promotion of laminar flow in the ozone abatement chamber.

FIG. 5 illustrates a plate for the promotion of laminar flow in the ozone abatement chamber. The plate 500 is designed to fit the openings in the chamber 310 and promote laminar flow. The plates are generally 0.0635 inches thick and have a plurality of holes approximately 0.625 inches in diameter. Plates 331, 332, 333, and 334 are also coated with a diffuse reflective material such as DPR. In addition, plates 336, 337, 338, and 339 may also be coated with the diffuse reflective material to promote reflective.

Figure 6:
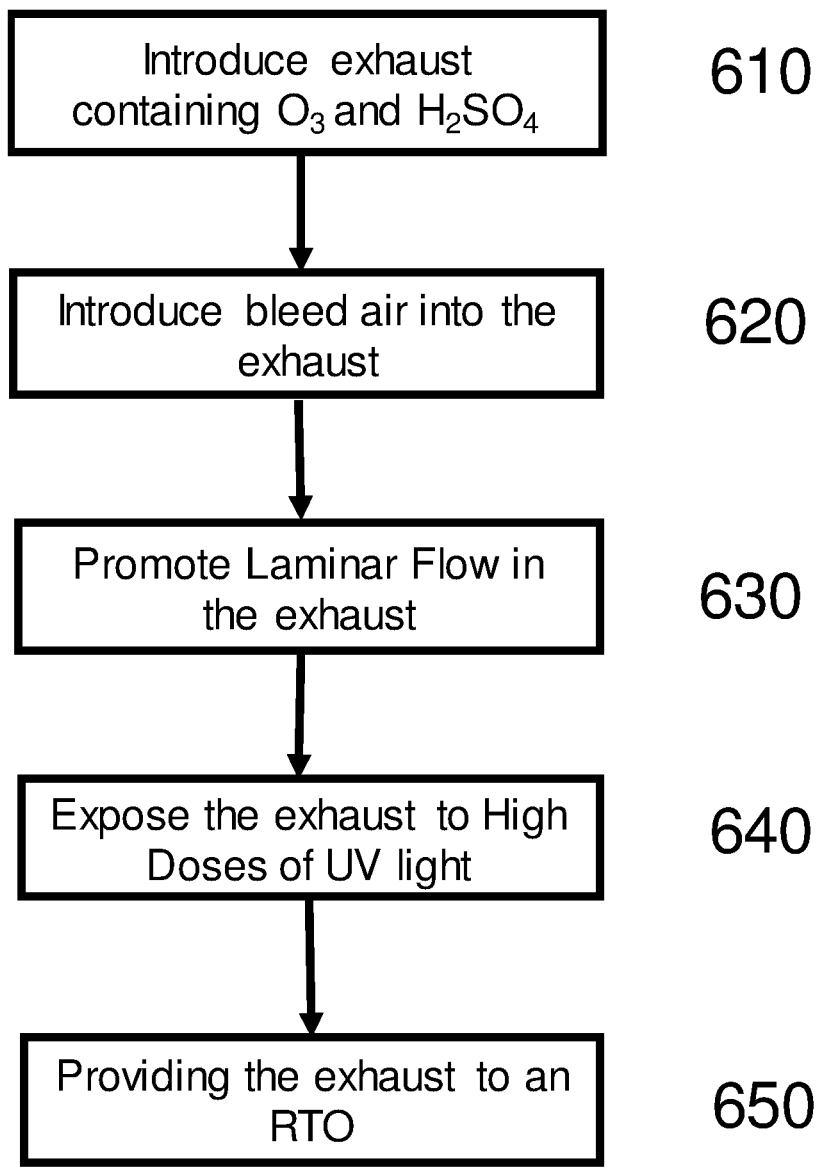
FIG. 6 illustrates a method to abate ozone, according to an embodiment of the present invention.

FIG. 6 illustrates a method to abate ozone utilizing the embodiments illustrated in FIG. 2-FIG. 5. The first step 610 may be to introduce an exhaust containing ozone and sulfuric acid into an abatement system. While one embodiment may be to include sulfuric acid which may be produced in a system for cleaning wafers, the first step may be limited to providing only ozone to the abatement system. Step 620 may be add bleed air to the exhaust. This may raise the flow of exhaust from 250 CFM to anywhere from 300 CFM to 500 CFM. Step 630 may be to promote laminar flow in the exhaust to improve the efficiency of the abatement of ozone. Step 640 may be to expose the exhaust to high doses of UV light to break down the ozone to oxygen. The final step in the process may be to pass the exhaust through the RTO to eliminate any remaining pollutants in the exhaust.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    causing exhaust air from an exhaust duct to enter an ozone abatement chamber comprising a central chamber and one or more UV lamps housed in one or more doors, inner surfaces of both the central chamber and the one or more doors are coated with a reflective material, the one or more doors are situated exterior to the central chamber and outside the flow of the exhaust air through the central chamber, the central chamber comprising a first series of laminar flow plates to ensure laminar flow through the central chamber, wherein at least the first series of laminar flow plates are coated with the reflective material;
    reducing a volume of sulfuric acid in the exhaust air to non-detectable levels by adding bleed air through an air port connected to the exhaust duct;
    passing the exhaust air from the ozone abatement chamber to a regenerative thermal oxidizer connected in series with the ozone abatement chamber such that the exhaust air exiting the ozone abatement chamber directly enters the regenerative thermal oxidizer.

2. The method of claim 1, further comprising:
    passing the exhaust air through a second series of laminar flow plates immediately preceding the ozone abatement chamber; and
    passing the exhaust air through a third series of laminar flow plates immediately following the ozone abatement chamber.

3. The method of claim 1, wherein the exhaust air comprises a combination of ozone ($O_3$) and sulfuric acid.

4. The method of claim 1, wherein the reflective material is polytetrafluoroethylene.

5. The method of claim 1, wherein the first series of laminar flow plates are at least 0.625 inches thick and are perforated with a plurality of equidistant holes.

6. The method of claim 1, wherein the one or more UV lamps produce at least 400 watts of UV light.

7. The method of claim 1, wherein the bleed air from the air port increases a velocity of the exhaust air greater than or equal to 300 to 500 CFM.

8. A method comprising:
causing exhaust air from an exhaust duct to enter a first ozone abatement chamber comprising a first central chamber and one or more UV lamps housed in one or more doors, inner surfaces of both the first central chamber and the one or more doors are coated with a reflective material, the one or more doors are situated exterior to the first central chamber and outside the flow of the exhaust air through the first central chamber, the first central chamber comprising a first series of laminar flow plates to ensure laminar flow through the first central chamber, wherein at least the first series of laminar flow plates are coated with the reflective material;
causing the exhaust air from the first ozone abatement chamber to enter a second ozone abatement chamber comprising a second central chamber through which the exhaust air passes and one or more UV lamps housed in one or more doors, inner surfaces of both the second central chamber and the one or more doors are coated with the reflective material, the one or more doors are situated exterior to the second central chamber and outside the flow path of the exhaust air through the second central chamber, the second central chamber comprising a second series of laminar flow plates to ensure laminar flow through the second central chamber, wherein at least the first series of laminar flow plates and the second series of laminar flow plates are coated with the reflective material;
reducing a volume of sulfuric acid in the exhaust air to non-detectable levels by adding bleed air through an air port connected to the exhaust duct; and
passing the exhaust air from the second ozone abatement chamber to a regenerative thermal oxidizer connected in series with the second ozone abatement chamber such that the exhaust air exiting the second ozone abatement chamber directly enters the regenerative thermal oxidizer.

9. The method of claim 8, wherein passing the exhaust air from the first ozone abatement chamber to the second ozone abatement chamber comprises:
passing the exhaust air through a third series of laminar flow plates positioned between the first ozone abatement chamber and the second ozone abatement chamber to maintain laminar flow of the exhaust air from the first ozone abatement chamber to the second ozone abatement chamber.

10. The method of claim 8, further comprising:
passing the exhaust air through a third series of laminar flow plates immediately preceding the first ozone abatement chamber; and
passing the exhaust air through a fourth series of laminar flow plates immediately following the second ozone abatement chamber.

11. The method of claim 8, wherein the exhaust air comprises a combination of ozone ($O_3$) and sulfuric acid.

12. The method of claim 8, wherein the reflective material is polytetrafluoroethylene.

13. The method of claim 8, wherein the first series of laminar flow plates and the second series of laminar flow plates are at least 0.625 inches thick and are perforated with a plurality of equidistant holes.

14. The method of claim 8, wherein the one or more UV lamps produce at least 400 watts of UV light.

15. The method of claim 8, wherein the bleed air from the air port increases a velocity of the exhaust air greater than or equal to 300 to 500 CFM.

16. A method comprising:
causing the exhaust air from an exhaust duct to enter an ozone abatement chamber, the ozone abatement chamber comprising a central chamber through which the exhaust air passes and one or more UV lamps housed in one or more doors, inner surfaces of both the central chamber and the one or more doors are coated with a reflective material, the one or more doors are situated exterior to the central chamber and outside the flow of the exhaust air through the central chamber, the central chamber comprising a first series of laminar flow plates to ensure laminar flow through the central chamber, wherein at least the first series of laminar flow plates are coated with the reflective material;
reducing a volume of sulfuric acid in the exhaust air to non-detectable levels by adding bleed air through an air port connected to the exhaust duct;
causing the exhaust air to pass through a second series of laminar flow plates positioned between the inlet and the ozone abatement chamber to further ensure laminar flow of the exhaust air as it enters the ozone abatement chamber, wherein the first series of laminar flow plates and the second series of laminar flow plates are positioned perpendicular to a flow direction of the exhaust air; and
passing the exhaust air from the ozone abatement chamber to a regenerative thermal oxidizer connected in series with the ozone abatement chamber such that the exhaust air exiting the ozone abatement chamber directly enters the regenerative thermal oxidizer.

17. The apparatus of claim 16, wherein the first series of laminar flow plates and the second series of laminar flow plates are at least 0.625 inches thick and are perforated with a plurality of equidistant holes.

18. The apparatus of claim 16, wherein the bleed air from the air port increases a velocity of the exhaust air greater than or equal to 300 to 500 CFM.

19. The apparatus of claim 16, wherein the one or more UV lamps produce at least 400 watts of UV light.

20. The apparatus of claim 16, further comprising:
adjusting a plurality of dampers to direct the flow of the exhaust air through, only the first ozone abatement chamber and not the second ozone abatement chamber, through only the second ozone abatement chamber and not the first ozone abatement chamber, or through both the first ozone abatement chamber and the second ozone abatement chamber.

* * * * *